United States Patent
Vahidsafa

(10) Patent No.: US 8,972,767 B2
(45) Date of Patent: Mar. 3, 2015

(54) METHOD AND APPARATUS FOR SYNCHRONIZING THE TIME REFERENCE OF A DYNAMICALLY ACTIVATED PROCESSOR TO THE SYSTEM TIME REFERENCE

(71) Applicant: Oracle International Corporation, Redwood City, CA (US)

(72) Inventor: Ali Vahidsafa, Palo Alto, CO (US)

(73) Assignee: Oracle International Corporation, Redwood City, CA (US)

( * ) Notice: Subject to any disclaimer, the term of this patent is extended or adjusted under 35 U.S.C. 154(b) by 287 days.

(21) Appl. No.: 13/679,690

(22) Filed: Nov. 16, 2012

(65) Prior Publication Data
US 2014/0143580 A1    May 22, 2014

(51) Int. Cl.
G06F 1/12 (2006.01)
G06F 1/04 (2006.01)
G06F 1/00 (2006.01)

(52) U.S. Cl.
USPC ............................ 713/400; 713/375; 713/322

(58) Field of Classification Search
USPC ......................................................... 713/400
See application file for complete search history.

(56) References Cited

U.S. PATENT DOCUMENTS

| | | | | |
|---|---|---|---|---|
| 4,816,990 | A | * | 3/1989 | Williams ...................... 713/375 |
| 5,307,483 | A | * | 4/1994 | Knipfer et al. .................. 714/10 |
| 6,928,566 | B2 | * | 8/2005 | Nunomura ..................... 713/322 |
| 7,369,538 | B1 | * | 5/2008 | Ehlinger et al. ............... 370/352 |
| 7,827,428 | B2 | * | 11/2010 | Arimilli et al. ................ 713/375 |
| 8,065,279 | B2 | * | 11/2011 | Errickson et al. ............. 707/687 |

OTHER PUBLICATIONS

IBM, Use of Counter to Synchronize multiprocessors, Aug. 1, 1990, IBM Technical Disclosure Bulletin, vol. No. 33, p. No. 461-462.*

* cited by examiner

*Primary Examiner* — Suresh Suryawanishi
(74) *Attorney, Agent, or Firm* — Polsinelli PC

(57) ABSTRACT

Implementations of the present disclosure involve an apparatus and/or method for synchronizing at least one newly activated processor with at least one previously running processor. Each processor is configured to generate a heartbeat and operate according to a STICK. When a previously deactivated processor is added, the heartbeat of each active processor is reset and the current STICK is transmitted to the newly activated processor on the next heartbeat. The newly activated processor may then add the heartbeat period to the acquired STICK and begin incrementing the STICK and normal operation after the next heartbeat.

17 Claims, 5 Drawing Sheets

METHOD AND APPARATUS FOR SYNCHRONIZING THE TIME REFERENCE OF A DYNAMICALLY ACTIVATED PROCESSOR TO THE SYSTEM TIME REFERENCE

FIELD OF THE DISCLOSURE

Aspects of the present invention relate to computing systems and, more particularly, aspects of the present invention involve an apparatus and/or method for synchronizing the time reference of a dynamically activated device to the time reference of the computing system.

BACKGROUND

Computers are everywhere in today's society. They come in all different varieties and can be found in places such as automobiles, laptops or home personal computers, banks, personal digital assistants, cell phones, and servers. In addition, as computers become more commonplace and software becomes more complex, there is a need for the computing devices to process more data at faster speeds using a smaller package and less power. Newer computing systems often have multiple processors with multiple processing cores running at higher operating frequencies than previous generations of processors, which often results in an increase in processing power for the processor. For example, newer server devices may run a plurality of such multi-core processors.

To take advantage of these multi-processor and multi-core processor systems, an emphasis in parallel computing has arisen. Parallel processing involves the breaking up of tasks into smaller ones and then distributing the tasks amongst the multiple processors and processor cores. The tasks are each completed independently and the results are then combined. This allows for large computational tasks to be completed in an efficient manner.

In order to synchronize these parallel computations, a systemwide time reference is typically used. This systemwide time reference increments indefinitely from when the system is turned on until it shuts down. This systemwide time reference is often referred to a system TICK or STICK and can be utilized by one or more programs to determine real-time. In general, the STICK increments at a constant rate independent of processor or processor core clock frequencies. Thus even a plurality of processors and multi-core processors operating at slightly different clock rates may still perform parallel operations. The STICK may also be utilized by the processors to determine a real-time clock signal to pace the executing applications to real-time.

Most STICK implementations are based on a distributed scheme, with each processor or each processor core individually keeping its own copy of STICK. When a server or cluster is started, each copy of STICK is set at zero and started at approximately the same time. This may be done by broadcasting a signal to all of the processors to start their respective STICK counters over a dedicated wire to a reset pin on each processor. This allows for all of the STICK counters to be approximately equal with the only differences being caused by the individual processor reaction times to the start signal.

In the modern computing world, there is also a constant push to reduce power consumption. The power consumed by a computing system has direct cost associated with powering processors and required components during operation as well as indirect costs such as cooling expenses. The more processors that are running, the higher the cooling costs and increased overall energy consumption.

In many cases, every processor and processor core isn't operating at maximum load, or may be completely idle. In these low load conditions, one ore more processors and processor cores may not even be needed and are thus simply wasting power and generating heat. Ideally, these unused or underused processors and processor cores could be shutdown and restarted as needed. This becomes problematic because once the processor has been shutdown, upon reactivation, the processor no longer has any knowledge of the current systemwide value of STICK and thus cannot synchronize operations with the already running processors. Similar issues arise when a processor or processors are added or hot-swapped during operation of the computing system.

Thus, techniques are described herein to allow for processors to be added, replaced or brought online and to synchronize operations with the previously running processors. This may be done to provide overall cost and power savings over previous processor designs, allow for the easier maintenance of servers, or provide a means for temporarily powering down a processor or processor core for any other reason while maintaining the ability to synchronize the newly activated processor or processor core to the various previously running processor(s).

It is with these and other issues in mind that various aspects of the present disclosure were developed.

SUMMARY

Implementations of the present disclosure involve an apparatus and/or method for synchronizing at least one newly activated processor with at least one previously running processor. Each processor is configured to generate a heartbeat signal, such as through a heartbeat counter, and operate according to a STICK. When a previously deactivated processor is reactivated, the heartbeat signal of each active processor is reset and the current STICK value is transmitted from an already active processor to the newly activated processor on the next heartbeat. The newly activated processor may then add the heartbeat period to the acquired STICK value and begin incrementing the STICK and normal operation after the subsequent heartbeat.

In general, the STICK counter, sometimes referred to herein as the "local counter", is an ever-incrementing counter that is utilized by a processor to indicate real time. The STICK counter may be written to with a value to synchronize the STICK counter with a currently operating STICK counter of another processor. In some embodiments, the STICK counter may include a reset to restart the counting or an enable function to initiate counting at some point. In one example, the STICK counter may be enabled to start after an initial value is written to the STICK counter.

Further, a heartbeat counter, sometimes referred to herein as the "global counter", provides a periodic and repeating signal, referred to herein as the "heartbeat signal" or "heartbeat". The heartbeat signal may comprise an incrementing signal that repeats after reaching a programmed value, or may comprise a decrementing signal that repeats after reaching zero. By definition a "pulse" of the heartbeat signal refers to the beginning of a period of the heartbeat, which for the case of a decrementing counter could be defined as the point that the heartbeat signal is passing through zero. As explained in more detail below, this repeating signal may be utilized by the processors of a system to enable certain operations of the STICK counter to synchronize a STICK counter with currently operating processors. Further, to facilitate the operation of the heartbeat counters, each heartbeat counter included in the computing system may include a reset function connected to a global reset signal that, upon activation, causes all of the heartbeat counters to synchronize the generated heartbeat signal.

One implementation of the present disclosure involves a computer system comprising a newly activated processor and an existing active processor. Each processor comprises a heartbeat signal generator circuit comprising a global timer configured to generate a system heartbeat signal by incrementing to a preconfigured value and restart to an initial value once the preconfigured value is reached, repeating continuously while the processor is in operation and a heartbeat reset signal configured to reset the global timer to the start value. Further, each processor comprises a local timer configured to track a system-wide incrementing value. Upon activation of the newly activated processor, a heartbeat reset signal is transmitted to at least the existing active processor and the newly activated processor. Also, the newly activated processor is configured to receive a current system-wide incrementing value that corresponds to a value of the system-wide incrementing value at a pulse of a heartbeat signal, increment the received value according to a period of system heartbeat signal, and load the total value into the local timer of the newly activated processor.

Another implementation of the present disclosure involves a computer system comprising a first processor and a second processor. Each processor comprises a heartbeat generator configured to generate a system heartbeat signal and a local timer configured to store and increment a STICK signal, the STICK signal comprising an incrementing value. Further, the computer system is configured to activate the second processor, reset the heartbeat generator on the first and second processors, and send a current STICK value that corresponds to a value of the STICK value at a pulse of a heartbeat signal from the first processor to the second processor, and start the local timer using the current STICK signal value plus a heartbeat period on a next heartbeat.

Yet another implementation of the present disclosure involves a method of synchronizing at least one newly activated processor with at least one previously running processors. The method comprises the operations of resetting a heartbeat counter of each active processor, the heartbeat counter configured to generate a repeating decrementing signal, sending a current STICK value when the decrementing signal reaches zero to the newly activated processor, incrementing the current STICK value by a heartbeat period at the newly activated processor, loading the incremented STICK value into a counter and starting the counter with the incremented STICK at the newly incremented processor on the next zero value of the decrementing signal.

DETAILED DESCRIPTION

Implementations of the present disclosure involve an apparatus and/or method for synchronizing a common time signal between two or more processors or processor cores in a computing system. In particular, the present disclosure provides for allowing for a newly activated processor or processor core to acquire a current common time signal and synchronize operations with at least one previously activated processor or processor core. The apparatus and/or method utilizes two counter circuits for each processing core of the computing system. A first counter, referred to herein as the "STICK" counter, maintains the common time signal for each core or processor. During activation of a processor, a second counter in each processor or core, referred to herein as the "heartbeat" counter, is globally reset to synchronize all of the second counters. The second counters for each core or processor generate a recurring heartbeat signal that counts, either by incrementing or decrementing, to a value before repeating or reloading. In one embodiment, each repeat of the heartbeat signal indicates a "pulse" of the heartbeat signal. Also during activation, a value of one or more of the first counters is provided to the newly active processor. The newly active processor then utilizes the heartbeat signal and the received common time signal value to synchronize the first counter with the computer system. In this manner, a newly added processor can synchronize with one or more executing processors.

Figure 1:
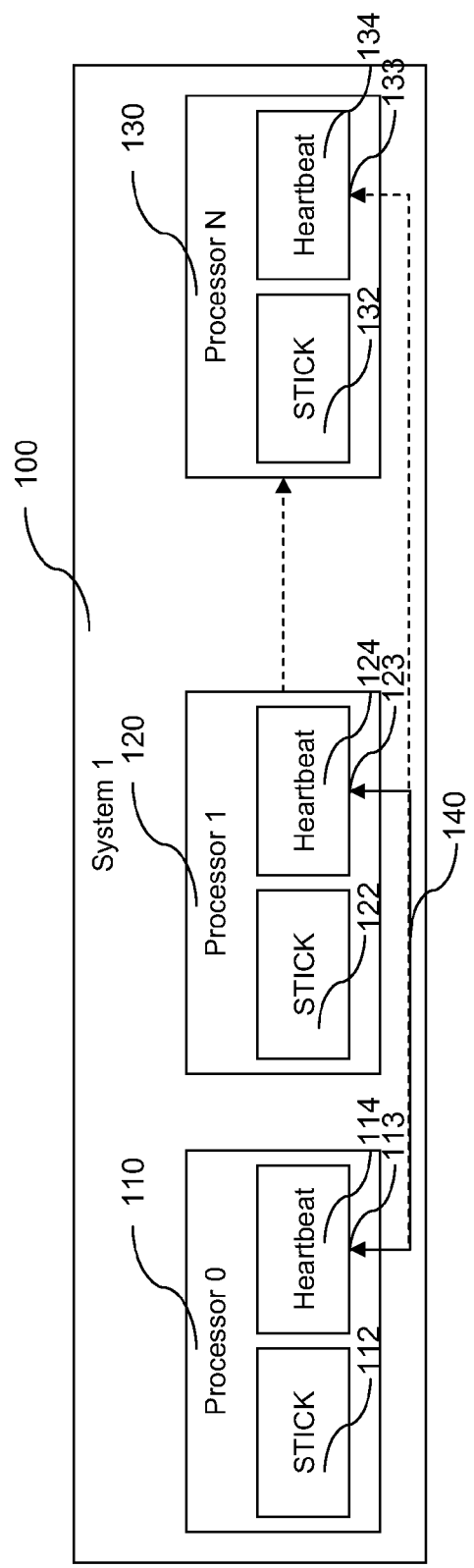
FIG. 1 is a block diagram illustrating an example of a computing system which may be used in implementing embodiments of the present disclosure.

FIG. 1 is a block diagram illustrating an example of a computing system 100 which may be used in implementing embodiments of the present disclosure. The computer system 100 may be a typical computer workstation, server, mainframe, or any other multi-processor or multi-core processor based computer. For example, the computer may include two or more processors 110, 120 up to n number of processors 130. The computer system 100 may be configured to deactivate and activate one of the processors 110, 120, 130. This may be done according to the computer system's 100 load conditions, maintenance requirements, or any other reason requiring the deactivation and reactivation of a processor 110, 120, 130. Each processor 110, 120, 130 may include system synchronization devices including a local timer 112, 122, 132 (labeled in FIG. 1 as "STICK") and a global timer 114, 124, 134 (labeled in FIG. 1 as "Heartbeat"). The global and local timers may be composed of hardware devices or may be a combination of hardware and software components. In one example, the global and local timers may be a counting device or counter circuit that increments or decrements by a value based on a clock signal. Typically, the local timers 112, 122, 132 and global timers 114, 124, 134 for the processors of a computing system operate on the same clock signal such that operation of the timers occurs simultaneously. The computer system 100 may utilize the local timers 112, 122, 132 and global timers 114, 124, 134 for synchronizing the operation of the processors 110, 120, 130, as described in more detail below.

In various embodiments, the computer system 100 includes any necessary additional parts required for operation as a computer, server, mainframe, or other computing device. For example, the computer system 100 may include various types of persistent and non-persistent memories, system busses, motherboards, chipsets, and I/O ports. The computer system 100 is also configured to support multiple processors, multiple processor cores and multiple multi-core processors. This includes any necessary circuitry or software required for supporting the use of multiple processors and the distribution of computing tasks amongst the processors. The division of computing tasks may be facilitated through the use of the STICK time signal on each processor. In particular, the processors or cores of the computer system may rely on the values of the STICK common time signal to synchronize the various computing tasks being executed simultaneously. Thus, proper synchronization of the STICK time signal between the various processors and/or cores ensures proper execution of an application in a parallel processing environment.

Further, the computer system 100 may also be configured to activate and deactivate processors in response to various system conditions. As such, the computer system 100 may include any circuitry or software required for deciding whether to activate or deactivate the various processors 110, 120, 130. For example, the computer system 100 may be configured to monitor the resource usage of each processor and determine whether to activate additional processors during high load conditions or deactivate processors during low load conditions. However, a processor that is activated from an idle state may not have a proper STICK value to synchronize execution of applications with the other processors or cores of the system. Thus, to synchronize a STICK time signal of an activated processor, the one or more global timers 114, 124, 134 of the processors may be utilized.

In the embodiment illustrated in FIG. 1, the global timers 114, 124, 134 are configured to generate a heartbeat. In one embodiment, the heartbeat may be a timer that continuously repeats from a start value to an end value, as long as the processor 110, 120, 130 is activated. In another embodiment, the global timers 114, 124, 134 may load a value from a register into a counter that counts down to zero, upon which the value is reloaded into the counter. The occurrence of the zero value defines the heartbeat signal. Thus, because the value loaded into the counter from the register is programmable, the period of the heartbeat is also programmable. In another embodiment, the global timers 114, 124, 134 may be configured to increment to a predetermined value and, upon reaching the predetermined value, restarting at zero and increment again to the predetermined value. In this embodiment, the restarting of the global timer 114, 124, 134 (or the occurrence of the zero value) indicates the "pulse" of the heartbeat signal. Thus, regardless of the embodiment used, the occurrence of the zero value in the counter may define the pulse of the heartbeat signal. As explained in more detail below, this heartbeat signal may be utilized by a computing system to initiate certain operations of the local timers to aid in synchronization of a newly active processor or core.

In addition, the global timers 114, 124, 134 of the system 100 may also include a reset link 140 connected to reset pins 113, 123, 133 located on each global timer. The resetting of the global timers 114, 124, 134 causes all of the global counters to generate their respective heartbeat signals or pulses in unison. In particular, a reset signal from a source, such as a processor, service processor, external agent, or software program tasked with synchronizing a newly activated processor or core, received at the reset pin 113, 123, 133 via a reset link 140 may be received at each global timer 114, 124, 134 and each heartbeat signal generated by the global counters are generated in unison. In general, any component of the computer system 100 or an external agent may be configured to reset the global timers 114, 124, 134.

In these embodiments, the system or local timers 112, 122, 132 are configured to store and increment the real time signal or STICK. The STICK signal represents a continuous count from when the computer system 100 is started until the computer system is turned off. The STICK may be used to synchronize the operations of the various processors 110, 120, 130 in the system. If a processor 110, 120, 130 is not activated, the processor is typically unable to keep track of the STICK such that synchronization to the STICK upon start up of a processor or core is desired.

In general, the local timer 112, 122, 132 is an ever-incrementing counter that is utilized by a processor to indicate real time. As explained above, the local counter may be configured to be written to with a value and to begin the incrementing of the counter on an enable signal or to begin incrementing once written to. For example, the local counter may be enabled to start after an initial value is written to the local counter, such as at the occurrence of a "pulse" of the heartbeat signal, as discussed in more detail below.

Figure 2:
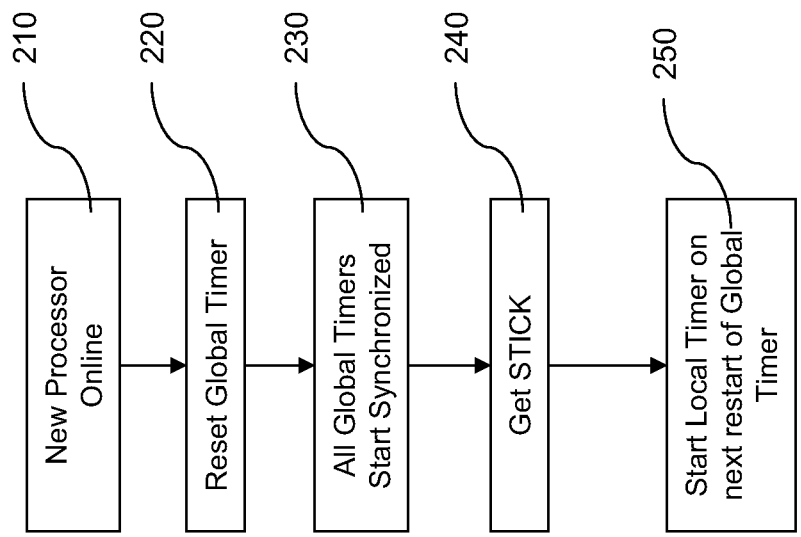
FIG. 2 is a block diagram illustrating an example of a first method for synchronizing a newly activated processor with previously activated or operating processors.

Referring now to FIG. 2, a flow chart illustrating a method of synchronizing the STICK of a newly activated processor with the STICK of an already running processor is depicted. The operations of FIG. 2 may be performed by any component of a computing system, such as a service processor, a power-management portion of the system, the activating processor, any program executing on the computing system, such as a power-management software program, or any combination of such components. Thus, the operations of FIG. 2 may be performed through hardware, software or a combination of hardware and software.

Reference is made to the computer system 100 of FIG. 1 in discussing the operations of the flow chart of FIG. 2. The computer system 100 features at least two processors 110, 120, 130, at least one of which is powered down, or deactivated (in this example, processor 120). Each of the active processors has a local timer 112, 132 maintaining copies of the STICK as well as a global timer 114, 134 maintaining a heartbeat signal. For any reason, a decision may be made to bring at least one of the deactivated processor 120 online (operation 210). When the newly activated processor is brought online, an electronic signal is sent on the reset link 140 to each reset pin 113, 133 of the global timers 114, 134 of the active processors in the computer system 100, resetting the global timer to the start value (operation 220). The global timers 114, 134 may then restart at substantially the same time as the global timer 124 of the starting up processor 120, resulting in nearly synchronized heartbeats (operation 230). At an arbitrary "pulse" of the heartbeat signal, one of the active processors 110, 130, perhaps in response to a request from a component of the computing system, sends a current STICK value to the newly activated processor(s) 120 (operation 240). The newly activated processor(s) 120 may then use the STICK value that is received to populate the processor's local timer 122 and begin incrementing on the next "pulse" of the heartbeat signal (operation 250).

Figure 3:
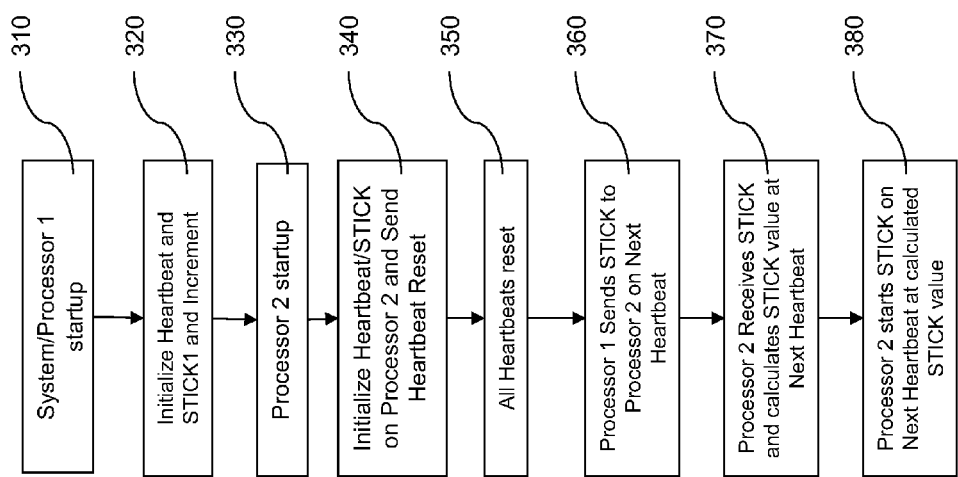
FIG. 3 is a block diagram illustrating an example of a second method for synchronizing a newly activated processor with previously activated or operating processors.

One disadvantage to the method depicted in FIG. 2 is that some delay occurs between the transmission of the STICK value and the receiving of the STICK value at the newly active processor 120. Depending on many factors of the computer system, such as distance of transmission and clock speed of the system, this delay may cause the received STICK value to be inaccurate. Thus, FIG. 3 depicts an alternative embodiment of a method of synchronizing the STICK of a newly activated processor with the STICK of already active processor. Similar to FIG. 2, the operations of FIG. 3 may be performed by any component of a computing system.

In this embodiment, when the computing system 100 is powered on, one or more processors may be activated (operation 310). Each activated processor may then initialize both the global timers and the local timers to produce a heartbeat signal and STICK signal. The global timers and local timers may begin incrementing after the initialization (operation 320). At some later time, the computing system may determine that an additional processor should be brought online and activates the additional processor (operation 330). Once the new processor is online, the new processor may initialize both the global timers and the local timers and send a heartbeat reset using the reset link (operation 340), as described above.

Each processor receives the reset and sets their respective heartbeats to the starting value (operation 350). In addition, the current STICK value may then be sent to the newly activated processor on an arbitrary "pulse" of the heartbeat signal from one or more of the operating processors (operation 360). In general, the period of the heartbeat is set such that the transmission of the STICK value arrives before the next "pulse" of the heartbeat signal occurs. For example, the heartbeat pulse may occur when the heartbeat signal reaches a zero value. In another example, the heartbeat pulse may occur when the heartbeat signal reaches a predetermined value and then restarts. Regardless of the embodiment used, the newly activated processor receives the STICK value between two "pulses" of the heartbeat signal. Further, because the newly activated processor has a copy of the same heartbeat signal that is synchronized at each processor, the processor can calculate the STICK value at the next "pulse" of the heartbeat signal. In particular, the processor can utilize the received STICK value and the period of the heartbeat signal to determine what the STICK value will be on the next "pulse" of the heartbeat signal. This value may be loaded into the local counter for the newly activated processor such that, upon the subsequent"pulse" of the heartbeat signal, the local counter can be enabled and be synchronized with the other local counters in the computing system.

For example, a group of processors may be synchronized to a heartbeat signal that repeats every 10 ms. During start up of a processor, the newly added processor may received a STICK value of 1 second when the heartbeat signal value is 1 ms. However, regardless of when the STICK value is received, the newly added processor can determine that the STICK value will be 1 second plus 1 ms as the heartbeat signals are synchronized and the STICK value was transmitted at the pulse of the heartbeat signal. Thus, the newly added processor can load a value of 1.001 seconds and can start incrementing the local timer or calculate that the STICK value at the next heartbeat will be 1.010 seconds and can start incrementing the local timer at that value at the next heartbeat pulse. Thus, the newly activated processor may then add the heartbeat period to the received STICK value (operation 370) and on the next heartbeat, the newly activated processor may then begin incrementing the STICK and operating in conjunction with the other active processors (operation 380).

Table 1 may be used to illustrate the process of activating a second processor in a two processor system. In this example, a first processor $P_0$ is active upon system startup. For simplifying this illustration, the heartbeat in this example has a start value of three and decrements to an end value of zero before resetting. It should be noted that the heartbeat signal may have any period. In this case, the STICK initializes to a value of zero and increments at the same rate as the heartbeat. It should be understood that the heartbeat length and incrementing rate may vary depending on implementation. Furthermore, the STICK in many cases may not increment at the same rate as the heartbeat. As shown by Table 1, once the STICK equals six, a second processor $P_1$ is activated. Once P1 is activated, a heartbeat reset is sent to $P_0$ which in turn resets it's heartbeat to the start value of three. On the next heartbeat, the current STICK of nine is transmitted to $P_1$. In this case, there is a delay between the transmission of the STICK and its reception at $P_1$. This delay provides no detriment to the operation of the system because $P_1$ adds the period of the heartbeat to the received STICK and doesn't begin incrementing the STICK until the next heartbeat. In this case, the received STICK has a value of nine, heartbeat period has a value of four, and the computed STICK of thirteen begins on the next heartbeat. Thus, the STICK on $P_1$ is substantially in sync with the STICK on $P_0$.

TABLE 1

| P0 | | | P1 | | |
| --- | --- | --- | --- | --- | --- |
| Heartbeat | STICK | Operation | Heartbeat | STICK | Operation |
| 3 | 0 | | OFF | OFF | |
| 2 | 1 | | OFF | OFF | |
| 1 | 2 | | OFF | OFF | |
| 0 | 3 | | OFF | OFF | |
| 3 | 4 | | OFF | OFF | |
| 2 | 5 | | OFF | OFF | |
| 3 | 6 | Reset | ON | — | Activate |
| 2 | 7 | | 2 | — | |
| 1 | 8 | | 1 | — | |
| 0 | 9 | Send STICK = 9 | 0 | — | |
| 3 | 10 | | 3 | — | Receive STICK = 9 |
| 2 | 11 | | 2 | — | |
| 1 | 12 | | 1 | — | STICK = 9 + 4 (e.g. length of heartbeat) |
| 0 | 13 | | 0 | 13 | Start STICK |
| 3 | 14 | | 3 | 14 | |
| 2 | 15 | | 2 | 15 | |
| 1 | 16 | | 1 | 16 | |
| 0 | 17 | | 0 | 17 | |

The above examples were discussed in respect to two or more single core processors. The method of synchronization requires no modification in order to operate with multi-core processors since multi-core processors simply behave as individual processors in the same electronic packaging. For example, referring to FIG. 4, the computer system 400 featuring a plurality of multi-core processors is depicted. In this system 400, each processor 410, 420, 430 has a first core 416, 426, 436 and a second core 418, 428, 438. Each core also includes a local timer 412 and a global timer 414.

Figure 4:
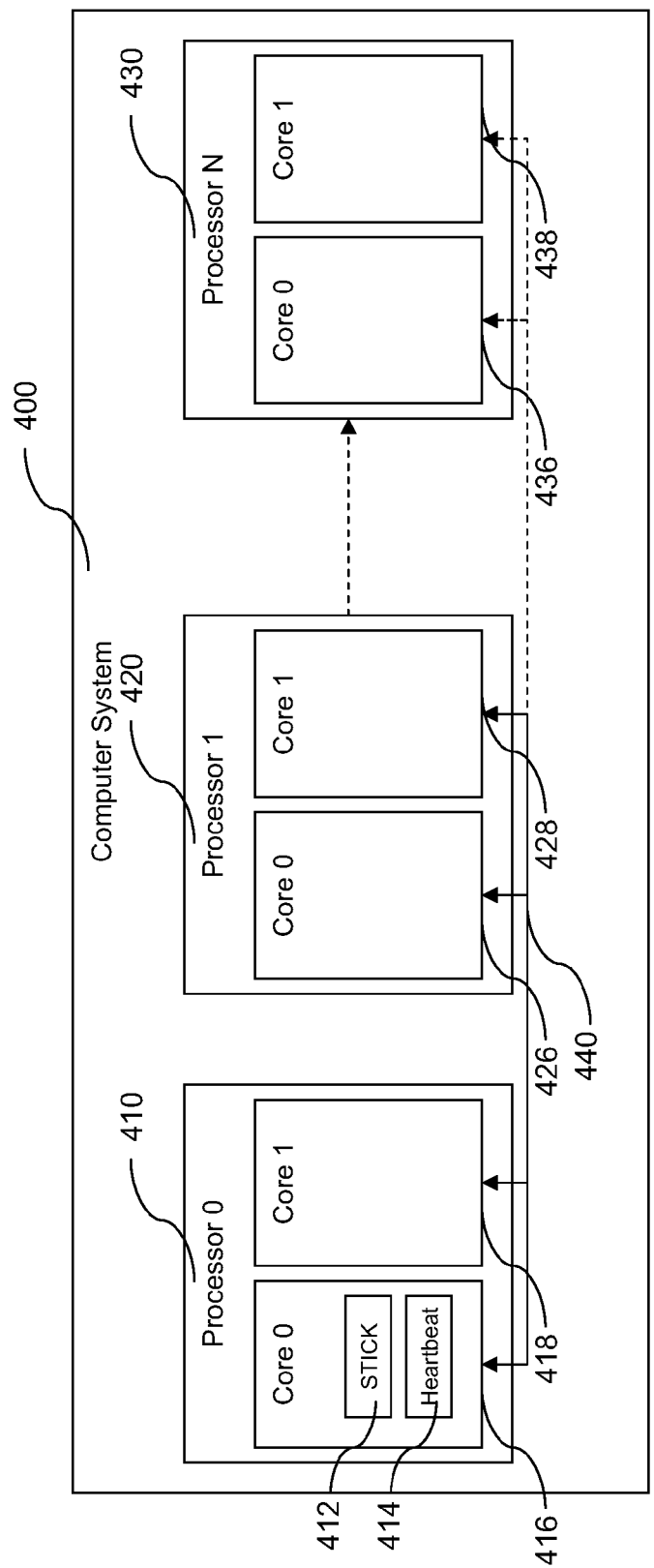
FIG. 4 is a block diagram illustrating an example of a computing system utilizing multi-core processors which may be used in implementing embodiments of the present disclosure.
Figure 5:
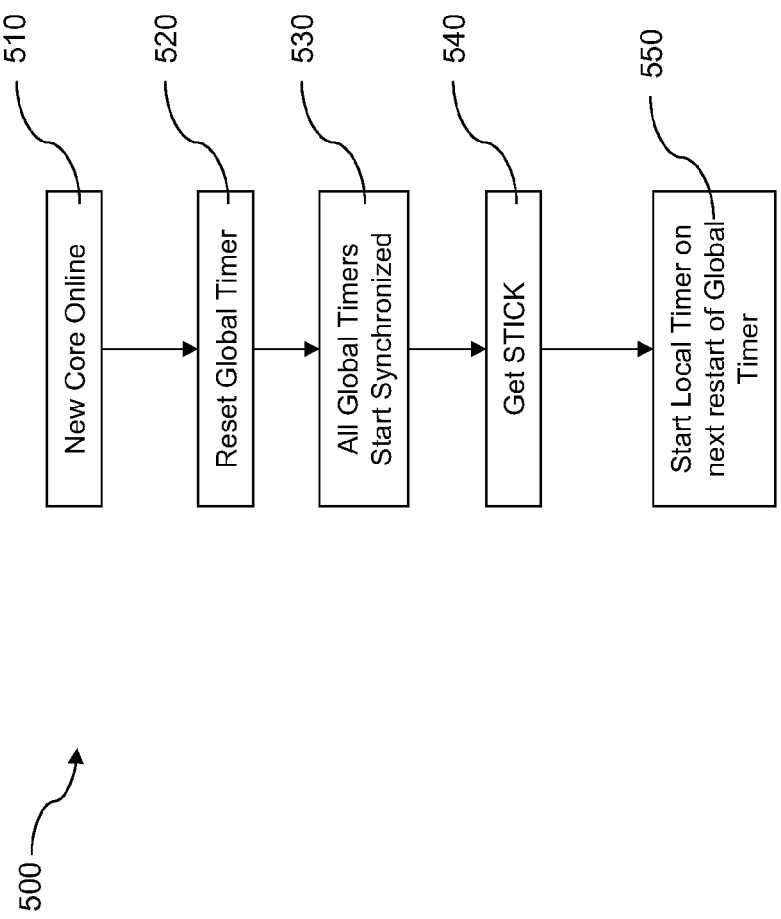
FIG. 5 is a block diagram illustrating an example of a method for synchronizing a newly activated processor core with previously activated processors.

Referring now to FIGS. 4 and 5, a method of adding an additional core in multi-core processor 500 is depicted. In this example, a decision may be made to bring at least one of the deactivated processor cores online (operation 510). When the newly activated processor is brought online, an electronic signal is sent on the reset link 540 to each reset pin in the computer system 400, resetting the global timer to the start value (operation 520). The global timers 412 may then restart at substantially the same time resulting in synchronized heartbeats (operation 530). At an arbitrary heartbeat, one of the active processors sends the STICK to the newly activated processor core(s) (operation 540). The newly activated processor core(s) may then use the STICK that is received to populate the core's system timer 412 and begin incrementing on the next heartbeat (operation 550). Similarly, this same method may be used to activate additional multi-core processors.

In another embodiment, the computer system 400 of FIG. 4 may include a system STICK counter and a heartbeat counter that is within the computer system but not a part of one of the cores of the system. Thus, this particular computer system 400, each core may be turned off in response to power considerations as desired by the computer system. Further, each core of the computer system 400 may utilize the system STICK counter and heartbeat counter to synchronize upon activation as described above. Importantly, this configuration allows each core to be turned off as needed while maintaining the synchronization to the STICK counter of the system. Imbedding such a mechanism inside a processor chip, enables the power saving scenario in which the processor chip must remain powered on, but all processor cores of that chip can be powered off The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A computer system comprising:
   a newly activated processor and an existing active processor, wherein each of the newly activated processor and the existing active processor comprises:
      a heartbeat signal generator circuit comprising:
         a global timer configured to generate a system heartbeat signal by incrementing to a preconfigured value and restart to a start value once the preconfigured value is reached, repeating continuously while the processor is in operation; and
         a heartbeat reset signal configured to reset the global timer to the start value; and
      a local timer configured to output a system-wide incrementing value;
   wherein upon activation of the newly activated processor, a heartbeat reset signal is transmitted to at least the existing active processor and the newly activated processor; and
   wherein the newly activated processor is configured to receive a current system-wide incrementing value, increment the system-wide incrementing value according to a period of system heartbeat signal, and load the system-wide incrementing value into the local timer of the newly activated processor.

2. The computer system of claim 1, wherein the computer system is configured to deactivate at least one processor based on computer system load conditions.

3. The computer system of claim 2, wherein the computer system is configured to deactivate at least one processor based on a user command to the computer system.

4. The computer system of claim 1, wherein the system-wide incrementing value comprises a first value started upon computer system activation and continuously counts until computer system deactivation.

5. The computer system of claim 1, wherein the computer system is configured to divide processing task between the newly activated processor and the existing active processor.

6. The computer system of claim 5, wherein the newly activated processor and the existing active processor are configured to synchronize the completion of tasks according to the system-wide incrementing value.

7. A computer system comprising a first processor and a second processor,
   wherein each of the first processor and the second processor comprises:
      a heartbeat generator configured to generate a system heartbeat signal; and
      a local timer configured to store and increment a STICK signal, the STICK signal comprising an incrementing value; and
   wherein the computer system is configured to activate the second processor, reset the heartbeat generator on the first and second processors, and send a current STICK value from the first processor to the second processor, and start the local timer using the current STICK signal value plus a heartbeat period on a next heartbeat.

8. The computer system of claim 7, wherein the first processor and the second processor further comprise a heartbeat reset.

9. The computer system of claim 7, wherein the heartbeat generator is configured to repeatedly start at a starting value, increment to a preset end value, and restart at the start value for as long as the processor is activated.

10. The computer system of claim 7, wherein the STICK comprises a counter started upon computer system activation and continuously counts until computer system deactivation.

11. The computer system of claim 7, wherein the computer system is configured to divide processing task between the first processor and the second processor.

12. The computer system of claim 11, wherein the at least two processors are configured to synchronize the completion of tasks according to the STICK.

13. The computer system of claim 7, wherein the computer system is configure to activate the second processor according to a user command.

14. The computer system of claim 7, wherein the computer system is configure to activate the second processor according to a load condition.

15. A method of synchronizing at least one newly activated processor with at least one previously running processors comprising:
   resetting a heartbeat counter of each active processor, the heartbeat counter configured to generate a repeating decrementing signal;
   sending a current STICK value when the decrementing signal reaches zero to the newly activated processor;
   incrementing the current STICK value by a heartbeat period at the newly activated processor;
   loading the incremented STICK value into a counter; and
   starting the counter with the incremented STICK at the newly incremented processor on the next zero value of the decrementing signal.

16. The method of synchronizing of claim 15, wherein the heartbeat counter comprises a repeating timer with a set period.

17. The method of synchronizing of claim 15, wherein the STICK continuously increments.

* * * * *

UNITED STATES PATENT AND TRADEMARK OFFICE
CERTIFICATE OF CORRECTION

PATENT NO. : 8,972,767 B2  
APPLICATION NO. : 13/679690  
DATED : March 3, 2015  
INVENTOR(S) : Vahidsafa Page 1 of 1

It is certified that error appears in the above-identified patent and that said Letters Patent is hereby corrected as shown below:

Title page

On first page, column 2, under Primary Examiner, line 1, delete "Suryawanishi" and insert -- Suryawanshi --, therefor.

Specification

In column 2, line 5, delete "ore" and insert -- or --, therefor.

In column 7, line 33, delete "subsequent"pulse"" and insert -- subsequent "pulse" --, therefor.

In column 9, line 13, delete "off" and insert -- off. --, therefor.

Signed and Sealed this
Twentieth Day of October, 2015

Michelle K. Lee
*Director of the United States Patent and Trademark Office*